J. O. TALMAGE.
Improvement in Corn-Planters.
No. 129,619.        Patented July 16, 1872.
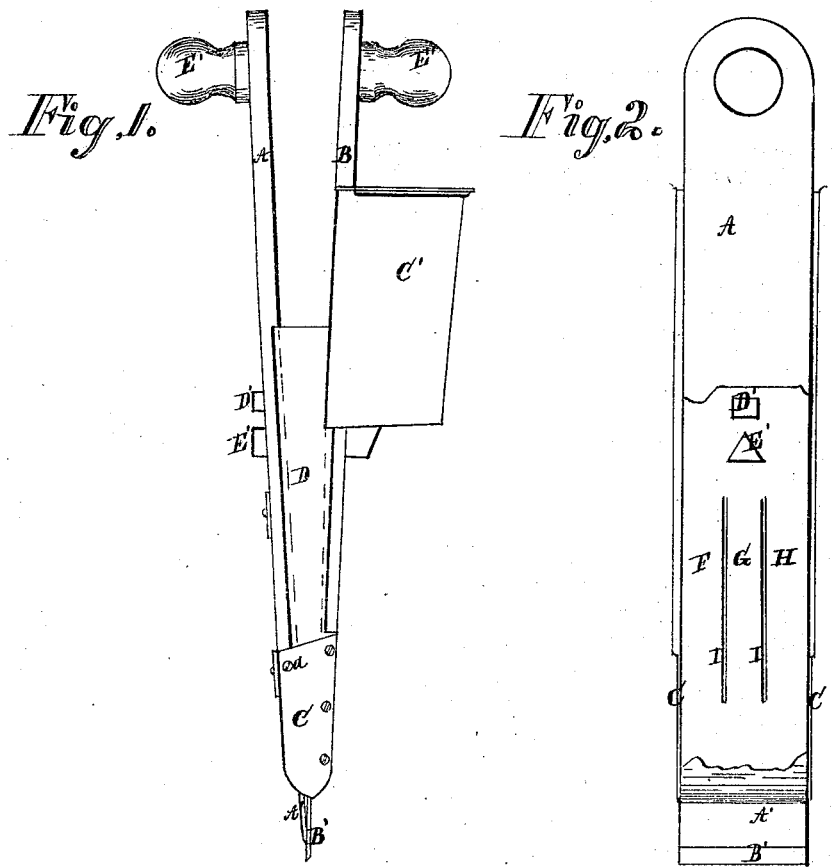
Witnesses.
A. L. Humphrey.
J. Brainerd
Inventor.
J. O. Talmage.
Per Burridge & Co.
Attys

129,619

UNITED STATES PATENT OFFICE.

JACOB O. TALMAGE, OF CARDINGTON, OHIO.

IMPROVEMENT IN CORN-PLANTERS.

Specification forming part of Letters Patent No. 129,619, dated July 16, 1872.

*To all whom it may concern:*

Be it known that I, JACOB O. TALMAGE, of Cardington, in the county of Morrow and State of Ohio, have invented a certain new and Improved Corn-Planter; and I do hereby declare that the following is a full, clear, and complete description thereof, reference being had to the accompanying drawing making part of the same.

SPECIFICATION.

Figure 1 is a side view of the planter. Fig. 2 is a view of the rear side. Fig. 3 is an inside view from the top.

Like letters of reference refer to like parts in the several views.

The nature of this invention relates to a hand corn-planter; and the object of the inventor is to so plant the corn that it shall be scattered in the hill instead of being thrown down close together; the scattering of the grain being accomplished by a dividing-box of a triangular shape, and arranged immediately under the seed-box. A more full and complete description of the operation is as follows:

In the drawing, Fig. 1, A B represent a pair of sides, the lower ends of which are secured in side plates C, the side B in a permanent manner, whereas the side A is pivoted in the plates at the point a, thereby making said side capable of being moved toward the fixed side B. The two sides A B are connected to each other by a flexible web, D, which, when the sides are spread apart, forms between them a kind of pocket, E, extending down to and opening into the space between the side plates C. The pocket E referred to is divided into three divisions, F G H, Fig. 2, by the partitions I. A part of the side A is represented as broken away, in order that the divisions, &c., may be seen, the purpose of which will presently be shown. To the lower ends of the sides A B are secured metal jaws A' B'. The jaw B', as will be seen, is the longest and not movable, whereas the jaw A' is movable, by virtue of its being pivoted to the immovable side B. To the side B is secured a seed-box, C', in the bottom of which is a slide, D', having therein a cup or hole, e, possessing a holding capacity of about four or five grains of corn. Said slide is fixed to the movable side A, and moves backward and forward in the bottom of the seed-box as the side may be operated to and from the side B. Immediately below the slide, and in line therewith, is a triangular dividing-bar, E', having one of its angles directed to the slide, whereas one side of the triangle covers the space G of the pocket, as shown in Fig. 2.

The practical operation of this planter is as follows: The seed is placed in the box C', and is discharged therefrom by the operator holding the planter in his hands by the handles F'. Now, on pulling the sides apart, as shown in Fig. 1, the slide is drawn out from the box, bringing with it in the hole e several grains of corn, which immediately fall through the hole and upon the angle of the divider E', whereby the several grains are scattered or divided, some falling down into the spaces F and H. The grain is held in the lower end of the pocket by the jaws, which are seen to be closed. Now, on thrusting said jaws into the ground, and pressing the side A toward the side B, the jaws open, and forcing apart the earth the seed drops into the hole thus made. The corn thus will be found scattered, and not altogether in a little heap.

In making the rigid jaw B' longer than the movable jaw A' less violence is exerted upon the pivotal joint of the movable jaw than there would be were the two jaws both of a length; hence the jaw A' is less liable to become battered and injured by its being thrust into the ground.

Claim.

What I claim as my invention, and desire to secure by Letters Patent, is—

The divider E', when rigidly attached to the part B and extending through the part A, combined with the slide D', hopper C', and divisions F H, substantially as and for the purpose set forth.

JACOB O. TALMAGE.

Witnesses:
　D. H. HINDMAN,
　S. BROWN.